United States Patent [19]
Reichel et al.

[11] Patent Number: 6,103,850
[45] Date of Patent: *Aug. 15, 2000

[54] SEALANTS MADE USING LOW UNSATURATION POLYOXYALKYLENE POLYETHER POLYOLS

[75] Inventors: Curtis J. Reichel, Southgate; Thomas L. Fishback, Gibraltar; Gladys M. Aviles, Canton, all of Mich.

[73] Assignee: BASF Corporation, Mt. Olive, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/754,565

[22] Filed: Nov. 21, 1996

Related U.S. Application Data

[60] Provisional application No. 60/009,313, Dec. 29, 1995.

[51] Int. Cl.[7] .............................. C08G 18/06; C08G 18/48
[52] U.S. Cl. ................................. 528/60; 528/65; 528/85; 528/409; 528/413; 528/419; 525/409; 568/620; 568/624
[58] Field of Search ............................... 528/66, 85, 409, 528/413, 419, 60; 568/620, 624; 525/409

[56] References Cited

U.S. PATENT DOCUMENTS

| | | |
|---|---|---|
| 2,425,845 | 8/1947 | Tcussaint . |
| 2,674,619 | 4/1954 | Lundsted . |
| 2,733,272 | 1/1956 | Horsley et al. . |
| 3,393,243 | 7/1968 | Cuscurida .............................. 568/620 |
| 3,865,762 | 2/1975 | Repiquet et al. . |
| 3,961,196 | 6/1976 | Earing et al. ............................ 568/624 |
| 4,301,110 | 11/1981 | Cuscurida et al. . |
| 4,355,188 | 10/1982 | Herold et al. . |
| 4,396,780 | 8/1983 | Shtykh et al. . |
| 4,411,819 | 10/1983 | Panek et al. . |
| 4,487,854 | 12/1984 | Hartman . |
| 4,665,239 | 5/1987 | Panek et al. . |
| 4,738,993 | 4/1988 | Markovs . |
| 4,745,170 | 5/1988 | Bushman et al. . |
| 4,764,567 | 8/1988 | Ott . |
| 4,812,350 | 3/1989 | Shrewsburg et al. . |
| 5,010,187 | 4/1991 | Heuvelsland . |
| 5,070,125 | 12/1991 | Heuvelsland . |
| 5,114,619 | 5/1992 | Heuvelsland ............................ 568/620 |
| 5,136,010 | 8/1992 | Reisch et al. . |
| 5,185,420 | 2/1993 | Smith et al. . |
| 5,266,681 | 11/1993 | Reisch et al. . |
| 5,326,833 | 7/1994 | Parodi et al. . |
| 5,357,038 | 10/1994 | Reisch et al. . |
| 5,374,705 | 12/1994 | Laycock et al. . |
| 5,731,407 | 3/1998 | Le-Khac .................................. 528/403 |
| 5,780,584 | 7/1998 | Le-Khac et al. ........................ 528/410 |

FOREIGN PATENT DOCUMENTS 6-248069  9/1994  Japan .

OTHER PUBLICATIONS

Encyclopedia of Polymer Science and Engineering, vol. 6, 2nd Edition, Copyright 1986–1,2–Epoxide Polymers.

*Primary Examiner*—Donald R. Wilson
*Attorney, Agent, or Firm*—Fernando A. Borrego

[57] ABSTRACT

There is provided an sealant made with an isocyanate or hydroxyl terminated prepolymer made by reacting a stoichiometric excess of an organic polyisocyanate with polyols made of at least a polyoxyalkylene polyether triol or a mixture thereof with a polyoxyalkylene polyether diol. The triol or diol has within its structure the nucleus of an initiator compound, an internal blocks of oxypropylene groups, and external blocks of oxyalkylene groups, wherein the internal blocks of oxypropylene are between said nucleus and said external blocks, said external blocks are made of oxyalkylene groups derived from a $C_4$ or higher alkylene oxide. The amount of the internal blocks of oxypropylene groups is from 25 weight percent to 80 weight percent based on the weight of all oxyalkylene groups and initiator in the prepolymer The triol or diol has a compatibility index of 25° C. or less, and may be part of a two component or a one component moisture cured sealant.

23 Claims, No Drawings

6,103,850

SEALANTS MADE USING LOW UNSATURATION POLYOXYALKYLENE POLYETHER POLYOLS

This application claims the benefit of U.S. Provisional Application Ser. No. 60/009,313, filed Dec. 29, 1995.

FIELD OF THE INVENTION

The present invention pertains to sealants made with certain polyoxyalkylene polyols. More particularly, the sealants are made with a polyoxyalkylene polyether polyol having an internal block of polyoxypropylene attached to the nucleus of an initiator molecule, followed by at least a $C_4$ or higher alkylene oxide in an amount sufficient to reduce the degree of unsaturation of the polyol to 0.06 meq/g of polyol or less.

BACKGROUND OF THE INVENTION

Methods of preparing elastomers are well known in the art. In general, an elastomer is prepared by reacting a polyoxyalkylene polyether polyol with an organic isocyanate in the presence of a chain extender. The chain extender may be a diol or a mixture of triols and diols such that the overall functionality of the mixture is generally less than 2.3. The polyoxyalkylene polyether polyols used in the preparation of elastomers generally have molecular weights ranging from 2,000 to 5,000. For the preparation of sealants, the chain extender may be a triol or a mixture of diols, triols, and/or tetrols, such that the overall functionality of the mixture ranges from greater than 2.3 to 3.0.

Polyoxyalkylene polyether polyols used in the preparation of polyurethane elastomers are generally prepared by reacting an initiator compound with an alkylene oxide in the presence of a basic catalyst such as sodium hydroxide, potassium hydroxide, tertiary amine, or an alkoxide. Such catalysts are useful in the preparation of polyoxypropylene polyols until the equivalent weight of the polyol reaches about 1,000 to 1,200, at which point an excess of allylic terminal unsaturation starts to develop. Formation of unsaturation is believed to be a consequence of propylene oxide isomerizing to allyl alcohol, which subsequently reacts with propylene oxide to form allyl (2-propenyl)ethers of polyoxypropylene. The point at which unsaturation begins to develop and the rate of unsaturation can be influenced by variables such as, temperature, pressure, catalyst concentration, and the type of catalyst employed. Beyond certain equivalent weights, it becomes difficult, if not impossible, to make a polyoxypropylene polyether polyol having adequate functionality using conventional catalysts. Thus, as is discussed further below, many attempts have been made to solve the problem of unsaturation by varying the kinds of catalysts used in the preparation of the polyol.

The drawback of polyether polyols having high levels of unsaturation is that the allylic terminal unsaturation reduces the functionality of the polyol and terminates chain growth, in the final polyurethane, thereby reducing the polyol's equivalent weight and broadening its molecular weight distribution. Employing a polyether polyol with a less than anticipated functionality and a high level of unsaturation in the manufacture of polyurethane sealants and elastomers results in the degradation of mechanical properties, such as hardness, and tensile strength. While one may keep the level of unsaturation low by making a very low equivalent weight polyol, elastomers and sealants should be made with high equivalent weight polyols to enhance their elasticity. Therefore, it is highly desirable to manufacture a high equivalent weight polyether polyol, suitable in the manufacture of sealants, adhesives, and elastomers, which approximates the functionality of the initiator as close as possible.

Several attempts have been made to reduce the unsaturation of polyoxyalkylene polyether polyols by experimenting with the kinds of catalysts used in their preparation. For example, U.S. Pat. Nos. 5,136,010; 5,185,420; 5,266,681; 5,116,931; 5,096,993; 4,985,491 each disclose the preparation of polyether polyols using a double metal cyanide (DMC) catalyst to reduce the level of unsaturation down to about 0.04 meq/g of polyol or less. The disadvantages of using DMC catalysts to prepare polyols are that such catalysts are quite expensive; and, as reported in U.S. Pat. No. 4,355,188, the polyols containing the DMC catalyst residues are less stable during storage, may give an odor to the polyol, and causes undesirable side reactions during the manufacture of polyurethane products. In the manufacture of a block polyether polyol having an oxyethylene cap, it is usually necessary to remove the DMC catalyst used to prepare the block of oxypropylene groups prior to polymerizing the cap of ethylene oxide, because the DMC residual catalyst would prevent the uniform addition of ethylene oxide across all functional sites on the growing polymer. Thus, DMC must be removed and a standard catalyst, such as KOH, must be added as additional processing steps when polymerizing blocks of oxyethylene groups.

U.S. Pat. Nos. 4,902,834 and 4,764,567 describe the use of an alternative catalyst, cesium hydroxide, for reducing the unsaturation of polyoxyethylene polyether polyols. These patents, however, lack general teachings on how and what catalysts would be effective to reduce the unsaturation of polyoxypropylene polyether polyols. Furthermore, it would be desirable to manufacture a polyether polyol with its level of unsaturation not so dependent upon a specific catalyst.

In addition to double metal cyanide and cesium based catalysts for lowering the unsaturation of polyether polyols, U.S. Pat. Nos. 5,010,187 and 5,070,125 also describe the use of barium or strontium based catalysts for reducing unsaturation. As with the cesium and DMC catalysts described above, it would be desirable to manufacture a low unsaturation polyether polyol which is not catalyst-dependent.

U.S. Pat. No. 4,687,851 discloses a polyether polyol having an unsaturation level of 0.06 meq/g or less made with conventional tertiary amines or sodium and potassium hydroxides. To obtain the low unsaturation, the polyether polyol must be amine-initiated. There continues to exist a need for the manufacture of polyether polyols having a low degree of unsaturation which are not limited to a specific initiator and which can be manufactured in the presence of conventional or other low cost catalysts.

In this regard, we began to investigate lowering the degree of unsaturation through methods other than improving processing techniques or divising new catalysts. We went down a path not thought of as a means for lowering unsaturation. By altering the structure of the polyol molecule, we discovered that the degree of unsaturation can be lowered significantly no matter what kind of catalyst is employed.

The structure of polyether polyols can vary widely depending upon the desired application. For example, conjugated or block polymers of ethylene oxide and propylene oxide reacted onto an initiator molecule are known to impart unique properties in a particular application depending upon the order of oxide addition. U.S. Pat. Nos. 3,036,118 and 3,036,130 each disclose conjugated block polymers of polyether polyols having an internal oxyethylene block followed by a block of oxypropylene groups for use as nonionic surface active agents. U.S. Pat. No. 4,738,993 also discloses a polyether polyol having an internal block of oxyethylene groups usefull in the manufacture of RIM polyurethane elastomers. Polyether polyols having an internal block of oxyethylene groups have also found use in improving the air flow and load bearing properties of polyurethane foams, as disclosed in U.S. Pat. No. 4,487,854.

Reversing the order of ethylene oxide and propylene oxide addition is also known. For example, surface active, detergent, and anti-foam polyether polyols having an internal block of oxypropylene groups followed by a chain of oxyethylene groups are known according to the teachings of U.S. Pat. Nos. 2,674,619 and 2,948,757. Such polyols have also found use in the manufacture of flexible polyurethane foams according to U.S. Pat. No. 3,865,762.

Polyether polyols having a heteric structure, wherein a mixture of alkylene oxides are added onto the initiator molecule such that the oxyalkylene groups are distributed in a random fashion on each molecule, are also known according to the teachings of various patents. According to these patents, suitable alkylene oxides usually include ethylene oxide, propylene oxide, and butylene oxide. For example, U.S. Pat. No. 4,812,350 teaches the manufacture of a heteric polyether polyol having certain weight proportions of ethylene oxide and either butylene oxide and/or propylene oxide for use as an adhesion enhancer in covered polyurethane foam panels. U.S. Pat. No. 2,733,272 recommends using a heteric polyoxyethylene-polyoxypropylene polyether of glycerol as a lubricant, especially in brake fluids. Heteric polyether diols are also disclosed in U.S. Pat. No. 2,425,845, and U.S. Pat. No. 4,301,110 teaches the manufacture of a polyether polyol having a heteric structure of oxyethylene and oxybutylene groups, optionally capped with a block of oxyethylene groups, useful in the manufacture of reaction injection molded parts.

There also exist polyether polyols having both a heteric and a blocked structure. For example, U.S. Pat. No. 4,487,854 discloses a polyether polyol having an internal block of oxyethylene groups followed by a heteric mixture of ethylene oxide, butylene oxide, and/or propylene oxide, optionally followed by a block of oxypropylene or oxybutylene groups as a terminal cap. The polyether polyol is said to impart good air flow properties and load bearing properties to a polyurethane foam.

None of these patents, however, teach the concept of reducing allylic unsaturation by altering the structure of the polyether polymer, or how such alteration should be made to effect the lowing of the degree of unsaturation. Further, most of these polyether polyols are too hydrophilic to be useful in elastomer sealant and adhesive applications.

SUMMARY OF THE INVENTION

It would be desirable to have a high equivalent weight polyether polyol containing a block of oxypropylene groups with reduced unsaturation. It would also be highly desirable that such polyether polyol can be prepared using an economical catalyst and whose method of preparation is not dependent upon employing a particular catalyst in order to achieve a reduction in unsaturation. We also sought to make a reduced unsaturation polyether polyol whose degree of unsaturation is not dependent upon the kind of initiator used, and specifically, making a reduced unsaturation polyether polyol which can be initiated with hydroxyl functional initiators. Further, these polyether polyols should be suitable for the manufacture of prepolymers for use in polyurethane elastomers, sealants, and adhesives, meaning that a significant portion of the polyether polyols should be hydrophobic.

There is now provided an sealant made with a prepolymer, the prepolymer made from a polyether polymer having a structure as follows:

the nucleus of an initiator compound, an internal block of oxypropylene groups, and a second block of oxyalkylene groups; the internal block of oxypropylene groups being disposed between the nucleus of the initiator and the second block, the second block containing at least some oxyalkylene groups derived from at least a $C_4$ or higher alkylene oxide.

This structure allows one to make a polyether polymer having a low degree of unsaturation, adjust the degree of hydrophobicity to a wide range of values, and may be simply manufactured without depending upon the use of exotic catalysts.

The amount of the internal block of oxypropylene groups is advantageously from 25 weight percent to 80 weight percent based on the weight of all oxyalkylene groups and initiator. The amount of the second block containing a $C_4$ or higher alkylene oxide should be effective to reduce the unsaturation of the polyether polyol to 0.06 meq KOH/g of polyol or less.

The preferable $C_4$ or higher alkylene oxide is 1,2-butylene oxide.

In another embodiment of the invention, the one or more second oxide compounds added onto the internal block of oxypropylene groups are a mixture of ethylene oxide and 1,2-butylene oxide.

In another advantageous embodiment of the invention, the above-described polyether polyol is terminated with a block of oxyalkylene groups which would yield primary hydroxyl functionalities, such as ethylene oxide.

Other embodiments and more preferential ranges are discussed further below in detail.

The polyether polyols of the invention have at least one of the following advantages and, in preferred embodiments, simultaneously possess all of the following advantages: they have a degree of unsaturation of 0.06 meq/g of polyol or less, they are not dependent upon the kind of catalyst or kind of initiator employed to achieve the stated reduction in the degree of unsaturation, the polyethers used in sealant applications have a CI of 25° C. or less, the polyethers have equivalent weights of at least 1500, and they are suitable for the preparation of elastomers, sealants, and adhesives having high elongation tensile strength, and modulus at 100 and 300 percent elongation.

DETAILED DESCRIPTION OF THE INVENTION

The polyoxyalkylene polyethers of the invention contain a nucleus of an initiator compound, an internal block of oxypropylene groups, and a second block of oxyalkylene groups containing an oxyalkylene group derived from a $C_4$ or higher alkylene oxide, in the stated sequential order. The polyoxyalkylene polyethers of the invention have a degree of unsaturation of 0.06 meq KOH/g of polyol or less. Surprisingly, this low degree of unsaturation can be attained in the manufacture of high equivalent weight polyethers, (such as an equivalent weight of at least 1500), in the presence of conventional catalysts such as sodium and potassium hydroxides. Prior to discussing the structure and method of preparation of the inventive polyethers, a brief overview of some terms as used throughout the specification and means for making calculations are now explained in further detail.

The polyoxyalkylene polyether polymers of this invention are mixtures of compounds which can be defined by equivalent weight and weight percent of oxyalkylene groups. If the amount of alkylene oxide reacted onto an initiator is relatively large, one does not obtain uniform molecular compounds having the same defined number of oxyalkylene groups; but rather, one obtains a mixture of closely related homologues wherein the statistical average number of oxyalkylene groups equals the number of moles of alkylene oxide added in the manufacturing process. Thus, one means of calculating the weight percent of oxyalkylene groups in the polyoxyalkylene polyether is by adding the number of moles, or the weight of, the particular alkylene oxide added to create the desired block. The equivalent weight of a chain within the polyether polymer can also be calculated by adding the total weight of the particular alkylene oxide charged divided by the functionality of the initiator molecule.

The polyoxyalkylene polyethers of this invention are "block" polymers of alkylene oxides. The polyethers of this invention contain a block of oxyalkylene groups in a chain connected to a block of different oxyalkylene groups in the chain to provide a conjugated unit structure necessary for imparting both hydrophobic and hydrophilic properties to the polymer. A block of oxyalkylene groups is typically thought of as containing the same type of oxyalkylene moieties, for example, a block of pure oxypropylene groups or a block of pure oxyethylene groups. In this invention, however, there may also be provided a "block" of a mixture of different oxyalkylene groups distributed in random order. The different oxyalkylene groups are randomly distributed, however, within the parameters of a discreet block rather than throughout the whole polymer chain.

The degree of unsaturation can be determined by reacting the polyether polymer with mercuric acetate and methanol in a methanolic solution to release the acetoxymercuric-methoxy compounds and acetic acids. Any left over mercuric acetate is treated with sodium bromide to convert the mercuric acetate to the bromide. Acetic acid in the solution can then be titrated with potassium hydroxide, and the degree of unsaturation can be calculated for a number of moles of acetic acid titrated. More specifically, 30 grams of the polyether polymer sample may be weighed into a sample flask, and 50 ml of reagent grade mercuric acetate in methanol is added to a sample flask and to a blank flask. The sample is stirred until the contents are dissolved. The sample and blank flasks are left standing for thirty (30) minutes with occasional swirling. Subsequently, 8 to 10 grams of sodium bromide are added to each and stirred for two (2) minutes, after which one (1) ml of phenolphthalein indicator is added to each flask and titrated with standard 0.1N methanolic KOH to a pink endpoint.

The degree of unsaturation is calculated and expressed as milliequavalents per gram:

$$= \frac{(\text{ml KOH sample} - \text{ml KOH blank}) \times \text{N KOH}}{\text{weight of sample}} - \text{Acidity}(A) \text{ as meq/g.}$$

The acidity correction is made only if the acid number of the sample is greater than 0.04, in which case it is divided by 56.1 to give meq/g.

The hydroxyl number of the polyether polyol can be experimentally measured by standard titration methods. Once the hydroxyl number has been measured by titration, the average molecular weight of the resulting polyether polymer can be calculated by the expression:

$$OH = (f)56{,}100 / M.W.$$

where f is the nominal functionality of the polymer based on the functionality of the initiator molecule.

The compatibility index (CI) is measured by heating the polyether polymer in a 50:50 wt. ratio of water to reagent grade isopropanol solution. 25 grams of the polyether polymer is added to a test tube. Then, 25 ml of the water/isopropanol solution is added and the test tube is immersed in a water bath. The mixture in the test tube is stirred at 300 rpm. If the mixture in the test tube is turbid at room temperature, the water bath is replaced with an isopropanol dry ice bath until the mixture in the test tube clears up. For CI's at below 15° C., the test tube is allowed to warm in air. If the expected CI is above 15° C., a water bath is used which is heated at a rate such that the bath temperature is about 3° C. higher than the temperature of the mixture in the test tube. In either case, as the CI value is approached, the mixture in the test tube will turn cloudy. Shortly after cloudiness, the mixture will turn hazy, or form discreet particles of a separate phase. This is the CI temperature.

Within the structure of the polyoxyalkylene polyether, there is first provided a nucleus of an initiator compound. The initiator compound contains at least two hydrogen atoms reactive to alkylene oxides. Specifically, the reactive hydrogen atoms on the initiator compound should be sufficiently labile to open up the epoxide ring of ethylene oxide. The initiator compound has a relatively low molecular weight, generally under 400, more preferably under 150. The initiator compound usually has from 2 to 6 carbon atoms.

Examples of initiator compounds useful in the practice of this invention include, but are not limited to, ethylene glycol, propylene glycol, diethylene glycol, dipropylene glycol, 2,3-butylene glycol, 1,3-butylene glycol, 1,5-pentanediol, 1,6-hexanediol, glycerol, trimethylol propane, sorbitol, sucrose, glycerin (glycerol), pentaerythritol, and the like and mixtures of any of these. Another class of reactive hydrogen compounds that can be used are the alkyl amines and alkylene polyamines having at least two reactive hydrogen atoms, such as methylamine, ethylamine, propylamine, butylamine, hexylarine, ethylenediamine, diethylenediamine, 1,6-hexanediamine, diethylenetriamine, and the like. Also, such cyclicamines such as piperazine, 2-methylpiperazine, 2,5-dimethylpiperazine and TDA can also be used. Amides constitute a further class of such reactive hydrogen compounds, such as acetaride, succinamide, and benzene sulfonamide. A still further class of such reactive hydrogen compounds are the di- and polycarboxylic acids, such as adipic acid, succinic acid, glutaric acid, aconitic acid, diglycolic acid, and the like. The initiator can also be one containing different functional groups having reactive hydrogen atoms, also, such as citric acid, glycolic acid, ethanolamine, and the like.

One of the advantages of the invention lies in the preparation of low unsaturation polyols using hydroxyl functional initiator compounds. In the preparation of sealants, adhesives, and elastomers, it is preferred that the initiator compound has two or three active hydrogen atoms; and it is more preferred that these active hydrogen atoms are hydroxyl fuinctionalities.

A mixture of initiator compounds may be used to adjust the functionality of the initiator to a number between whole numbers. In the preparation of elastomers, it is desirable to employ an initiator having a functionality as close to 2 as possible; while in the preparation of sealants, it is desirable to employ an initiator having a functionality within the range of 2.3 to 3.0. Therefore, if one desires to manufacture an elastomer having only a slight degree of crosslinking, a high proportion of an initiator having a functionality of 2, to which is added relatively small amounts of tri- or higher functional initiator compounds, may be mixed together to arrive at an initiator having an average functionality close to 2, such as from 2.0 to less than 2.3. On the other hand, a larger proportion of tri- or higher functional initiator compounds can be mixed with a di-functional initiator compound when a higher degree of crosslinking is desired, such as in the preparation of sealants and adhesives. As noted above, it is most preferred that all such functionalities be hydroxyl functionalities.

The polyether of the invention may be prepared by the addition reaction between a suitable initiator compound directly or indirectly with a defined amount of propylene oxide to form an internal block of oxypropylene groups, followed by further direct or indirect addition of one or more second oxides comprising a $C_4$ or higher alkylene oxide.

In one embodiment of the invention, propylene oxide is added to and reacted directly with a di- or higher functional initiator compound through the reactive hydrogen atom sites to form an internal block of polyoxypropylene groups. The structure of such an intermediate compound can be represented according to the following formula:

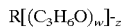

wherein R is the nucleus of the initiator; w is an integer representing the number of oxypropylene groups in the block such that the weight of the oxypropylene groups is from 25 to 80 weight percent, based on the weight of all alkylene oxides added and initiator; and z is an integer of 2 or more representing the number of reactive sites on the initiator molecule onto which are bonded the chains of oxypropylene groups. The internal block of oxypropylene groups imparts hydrophobic characteristics to the polymer, which is essential to repelling water and avoiding the swelling and degradation of elastomers, sealants, and adhesives made with the polyether polymer. The hydrophobic characteristic of a polymer can be measured by the compatibility index.

The block of oxypropylene groups is internal to the polyoxyalkylene polyether polymer. By an internal block is meant that the block of oxypropylene groups should be structurally located between the nucleus of the initiator compound and another block of one or more different kinds of oxyalkylene groups. It is within the scope of the invention to interpose a block of different oxyalkylene groups between the initiator nucleus and the block of oxypropylene groups, especially if the different oxyalkylene groups are also hydrophobic. In a preferable embodiment, however, the internal block of oxypropylene groups is directly attached to the nucleus of the initiator compound through its reactive hydrogen sites. This preferred embodiment may be carried out by directly reacting the initiator compound with propylene oxide.

The internal block of oxypropylene groups consists essentially of oxypropylene groups, meaning that substantially all of the alkylene oxides added to form the internal block are propylene oxide compounds. It is within the spirit and scope of the invention that the internal block of oxypropylene groups may contain a minor number of different oxyalkylene groups, such as oxyethylene or oxybutylene groups. The internal block of oxypropylene groups is designed to impart hydrophobic characteristics to the polyoxyalkylene polyether polymer in order to repel water, and reduce the swelling and degradation of elastomers, sealants, and adhesives made with such polyethers. While alkylene oxides which would impart hydrophilic properties to the polyether polymer can be tolerated in small amounts, they should be avoided to the extent that the hydrophobicity of the polymer is so impaired that the resulting elastomers, adhesives, or sealants made therewith show signs of water swelling and degradation. Further, while oxybutylene groups are hydrophobic, a commercial advantage is achieved by using as much propylene oxide as possible without significantly lowering the functionality of the polyether polymer. In general, 5 weight percent or less of all the propylene oxide added as an internal block can be in the form of different alkylene oxides, such as ethylene oxide, butylene oxide, tetrahydrofuran, etc. In a more preferable embodiment, less than 2 weight percent based on the internal block is made up of oxyalkylene groups which are different from oxypropylene groups. In the most preferred embodiment, the internal block consists solely of oxypropylene groups.

The polyoxyalkylene polyether polymer may comprise more than one internal block of oxypropylene groups. Whatever the number of internal blocks of oxypropylene groups located in the polyether polymer structure, the total weight of oxypropylene groups is advantageously from 25 weight percent to 80 weight percent based on the weight of all oxyalkylene compounds added to the initiator and the initiator itself In the method of the invention, an initiator compound is reacted in sequential order with propylene oxide, followed by a reaction with one or more second oxides. By "sequential order" is meant only that there should appear at least one block of oxypropylene groups internal to the polyether polymer, followed by directly adding onto the internal block one or more second oxides as defined herein, or indirectly adding onto the internal block of oxypropylene groups one or more second oxides as defined herein, through other alkylene oxides. In a preferred embodiment of the invention, the oxypropylene groups are attached to the initiator compound through its alkylene oxide reactive sides, and the one or more second oxides comprising a $C_4$ or higher alkylene oxide are directly added onto the internal block of oxypropylene groups to form a second block of oxyalkylene groups directly attached and bonded to the internal block of oxypropylene groups.

The block of oxypropylene groups is from 25 weight percent to 80 weight percent based upon the weight of all oxyalkylene compounds added to the initiator compound and the initiator. This weight percentage can be determined experimentally by gas chromatography or on a calculated basis from the actual weight of propylene oxide groups added in the manufacture of the polyether polymer, assuming the reaction time, temperature, and pressures are set for reacting out all the propylene oxide added in a reaction vessel for the manufacture of the polyether. The amount of propylene oxide is at least 25 weight percent. Adding propylene oxide in the amounts of less than 25 weight percent, or a polyether polymer containing less than 25 weight percent of oxyethylene groups, renders the polyether polymer insufficiently hydrophobic for many applications and causes the mechanical properties of elastomers and sealants made with the polyether to degrade. The upper limit of propylene oxide addition for most embodiments, or the upper limit of oxypropylene groups in the polyether polymer structure, is 80 weight percent. At amounts greater than 80 weight percent, a significant amount of terminal allylic unsaturation develops in the manufacture of higher equivalent weight polyether polymers. In a more preferable range, the relative amount of oxypropylene groups ranges from 60 to 75 weight percent.

In building the block of oxypropylene groups, terminal allylic unsaturation develops as the equivalent weight of the block of oxypropylene groups grows; and the degree of unsaturation becomes more pronounced as the equivalent weight increases. While the reaction conditions and types of catalysts employed influence the degree of unsaturation developed for any given polyether polymer, one begins to notice unsaturation developing using conventional KOH catalysts when the equivalent weight of the block of oxypropylene groups is about 800 or more with more pronounced effects when the equivalent weight of oxypropylene groups is about 1,000 or more. When the equivalent weight of the block of oxypropylene groups is about 1,700 or more, such a large amount of terminal allylic unsaturation develops that the mechanical properties of elastomers, sealants, and adhesives made with these polyether polymers are noticeably deteriorated. Therefore, in one embodiment of the invention, sufficient propylene oxide is added to form a block of oxypropylene groups such that the equivalent weight of the block is at least about 800 and no more than about 1,700, more preferably from about 1,000 to about 1,300.

The object of adding only a limited number of propylene oxide compounds is to avoid a significant buildup of terminal unsaturation. In some embodiments, e.g., where cesium hydroxide catalysts are used, however, it is not necessary to discontinue propylene oxide addition until a degree of terminal unsaturation develops beyond a certain point. Therefore, rather than discontinuing addition of propylene oxide within a minimum equivalent weight of about 800 or more to a maximum of about 1700, addition of propylene oxide may cease when the degree of unsaturation of the growing block of oxypropylene oxide groups is measured at 0.010 meq/g of polyol or more. Thus, the addition of the one or more second oxides in this embodiment may commence when 0.01 meq/g of polyol unsaturation or more develops, or in the alternative, when the equivalent weight of the block of oxypropylene groups is about 1,700, most preferably, 1,300.

After the internal block of oxypropylene groups is manufactured, one or more second oxides, at least one of which is a $C_4$ or higher alkylene oxide, are added directly or indirectly to the internal block of oxypropylene groups. The purpose for addition of a $C_4$ or higher alkylene oxide is to continue building a block of hydrophobic oxyalkylene groups which are resistant to the formation of terminal allylic unsaturation. Alkylene oxide compounds resistant to this kind of isomerization are those compounds having substituents which can donate electron density to the alpha carbon next to and attached to the carbons bound in the epoxide ring, and in particular, alkyl substituents attached to the alpha carbon; or alkylene oxides which contain no alpha carbon. Examples of the one or more second alkylene oxide compounds are ethylene oxide, 1,2-butylene oxide, 1,2-hexene oxide; 1,2-tert-butyl ethylene oxide; cyclohexene oxide; 1,2-octene oxide; cyclohexylethylene oxide; styrene oxide; phenyl glycidyl ether; allyl glycidyl ether; 1,2-decene oxide; 1,2-octadecene oxide; epichlorohydrin; epibromohydrin; epiiodohydrin; perfluoropropylene oxide; cyclopentene oxide; and 1,2-pentene oxide, among others. When ethylene oxide is used, it must be mixed with a $C_4$ or higher alkylene oxide.

In a preferred embodiment of the invention, the one or more second alkylene oxides are at least 1,2-butylene oxide compounds. In another preferred embodiment of the invention, the one or more second alkylene oxides are made up of a mixture of 1,2-butylene oxide and ethylene oxide. The one or more second alkylene oxides are preferably reacted directly with the internal block of oxypropylene groups to form a second block of oxyalkylene groups. When only a single alkylene oxide, such as 1,2-butylene oxide, is used as the one or more second alkylene oxide compounds, the second block of oxyalkylene groups will be a block of oxybutylene groups. Such a structure can be represented by the following block formula:

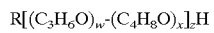

where R, w, and z are as defined above, and x is an integer representing the number of oxybutylene groups.

In the case where a mixture of alkylene oxides are employed, such as ethylene oxide and 1,2-butylene oxide, the second block will be made up of a mixture of oxyethylene and oxybutylene groups in random distribution. Such a structure can be represented by the following block formula:

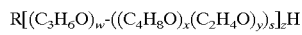

where R, w, x, and z are as stated above, y is an integer representing the number of oxyethylene groups; s is an integer, preferably 1, representing the number of blocks of oxybutylene-oxyethylene mixtures, and each s block is a random mixture of oxybutylene and oxyethylene groups the s block being attached through a bond to the block of oxypropylene groups.

The total amount of the one or more second alkylene oxides added in the manufacture of the polyether polyol and the amount of the resulting second block of oxyalkylene groups is effective to reduce the degree of unsaturation of the polyether polyol to 0.06 meq/g of polyol or less. By the term "reduce" is meant a reduction in unsaturation compared to a polyether polymer made with the same initiator, under the same reaction conditions and catalysts, and made to the same equivalent weight of the final polyether polymer, but using solely propylene oxide as the alkylene oxide added to the initiator molecule. A particularly advantageous feature of the invention lies in the flexibility of adjusting the degree of unsaturation merely by adding a greater amount of the one or more second oxides as defined herein rather than changing catalyst types or reaction conditions, which are quite expensive or time consuming. Where the ultimate use of the polyether polymer lies in applications benefiting from degrees of unsaturation much lower than 0.06, the one or more second alkylene oxides may be added early when little, if any, unsaturation has developed during the manufacture of the internal block of oxypropylene groups. Also, more or less of the one or more second alkylene oxide compounds may be added to adjust the degree of unsaturation.

One of the embodiments of the invention lies in the manufacture of a polyether polymer having a degree of unsaturation of 0.03 or less finding beneficial use in elastomers, without having to resort to unusual reaction conditions or exotic and expensive catalysts, such as double metal cyanide catalysts. In a particularly preferred embodiment of the invention, 1,2-butylene oxide is reacted onto the internal block of oxypropylene groups, in amounts sufficient to reduce the degree of unsaturation of the resulting polyether polymer to 0.06 meq/g of polyol or less where the end use of the polyether polymers is in the manufacture of sealants and adhesives, and to 0.03 or less where the end use of the polyether polymer is in the manufacture of elastomers. The amount of 1,2-butylene oxide to achieve this objective is generally from at least 5 weight percent, and more preferably at least 10 weight percent, based upon the weight of all oxyalkylene compounds added to the initiator compound and the initiator. Usually, no more than 20 weight percent is needed to accomplish a reduction in unsaturation.

It is possible to reduce the degree of unsaturation of the polyether polymer to 0.06 or less by adding solely ethylene oxide onto the internal block of oxypropylene groups. However, so much ethylene oxide would have to be added to acheive a comparable molecular weight polymer that the polyether polymer would become too hydrophilic. Thus, it is critical to the invention that the hydrophobic $C_4$ or higher alkylene oxides are added in significant amounts in the second block of alkylene oxides to maintain the desired hydrophobic characteristics.

Where a mixture of ethylene oxide and 1,2-butylene oxide is employed, the relative amounts of each alkylene oxide will depend upon the desired degree of hydrophobicity as measured by the compatibility index.

While the particular weight ratio of 1,2-butylene oxide to ethylene oxide is not limited, suitable relative amounts of each can range from 0.5:1 to 4:1. Preferred amounts of 1,2-butylene oxide to ethylene oxide range from about 1:1 to 2:1 particularly when improved hydrophobicity of the resultant elastomer, sealant or adhesive is desirable. The more ethylene oxide that is added, the more hydrophilic is the nature of the second block of one or more alkylene oxide groups. The more $C_4$ or higher alkylene oxides that are added in the second block, the more hydrophobic will be the nature of the second block of second oxyalkylene groups.

The total weight of the second block of one or more second oxyalkylene groups will generally range from 5 weight percent to 75 weight percent, more preferably from greater than 5 weight percent to 50 weight percent, and most preferably from 10 weight percent to 30 weight percent, based upon the weight of all oxyalkylene compounds added to the initiator compound and the initiator.

The polyether polymers of the invention are terminated with two or more isocyanate reactive hydrogens. The reactive hydrogens may be in the form of primary or secondary hydroxyl groups, or primary or secondary amine groups. In the manufacture of elastomers, sealants, and adhesives, it is often desirable to introduce isocyanate reactive groups which are more reactive than secondary hydroxyl groups. Primary hydroxyl groups can be introduced onto the polyether by reacting the growing polyether polymer with ethylene oxide. Therefore, in one embodiment of the invention, the polyether polymer may be terminated with a terminal block of oxyethylene groups. Alternatively, in another embodiment, the polyether polymer of the invention may be terminated with of a mixture of primary and secondary terminal hydroxyl groups when a mixture of ethylene oxide and 1,2-butylene oxide is employed in the manufacture of the second block of one or more second alkylene oxides. Primary and secondary amine groups can be introduced onto the polyether polymer by a reductive amination process as described in U.S. Pat. No. 3,654,370, incorporated herein by reference.

The polyether polymer of the invention is preferably a polyether polyol.

The polyether polyol may optionally be terminated with a terminal block consisting essentially of oxyethylene groups containing a primary hydroxyl group on the terminal carbon of the terminal block. The weight of the terminal block of oxyethylene groups when employed, is at least 4 weight percent, preferably from 10 weight percent to 25 weight percent, based upon the weight of all oxyalkylene compounds added to the initiator and the initiator.

In the manufacture of sealants and adhesives, the polyether polymers used will usually have either a low equivalent weight terminal block of oxyethylene groups or no terminal block of oxyethylene groups at all. Sufficient reactivity may be provided by way of primary hydroxyl functionality through a mixture of ethylene oxide and the $C_4$ or higher alkylene oxides, used in the manufacture of the second block. The CI of the polyether polymer for use in these applications is advantageously 25° C. or less.

In the manufacture of elastomers, however, it is often desired to enhance the reactivity of polyether polyols. This is accomplished by terminating the polyether polymer with a terminal block oxyethylene groups. While it is possible to aminate the terminal block of oxyethylene groups, it is more desirable to have a primary hydroxyl group attached to the terminal carbon of the terminal block of oxyethylene groups. The weight percent of the terminal block of oxyethylene groups on polyether polymers used in the manufacture of elastomers should be at least 4 weight percent, more preferably from 10 weight percent to 25 weight percent, based on the weight of all oxyalkylene groups on the polyether polymer and the initiator.

The method of polymerizing the polyether polymers of the invention is not limited and can occur in one of three different ways: anionic, cationic, and coordinate mechanisms.

Methods of anionic polymerization are generally known in the art. Typically, an initiator molecule is reacted with an alkylene oxide in the presence of a basic catalyst, such as an alkoxide or an alkali metal hydroxide. The reaction can be carried out under super atmospheric pressure and an aprotic solvent such as DMSO or THF, or in bulk.

One feature of the invention lies in the ability to manufacture a polyether polymer having a low degree of unsaturation and a high equivalent weight without regard to the type of catalyst employed. For example, low degrees of unsaturation can be obtained in high equivalent weight polyether polymers using such conventional catalysts as potassium and sodium hydroxide. The type of catalyst employed is not limited by the invention. Catalysts, such as alkali metal alkoxides, cesium based catalysts, and double metal cyanide catalysts as described in U.S. Pat. No. 3,829,505, incorporated herein by reference and the hydroxides and alkoxides of lithium and rubidium, may be employed.

Cesium-containing catalysts include cesium oxide, cesium acetate, cesium carbonate, cesium alkoxides of the $C_1$–$C_8$ lower alkanols, and cesium hydroxide. Other useful catalysts include the oxides, hydroxides, hydrated hydroxides, and the monohydroxide salts of barium or strontium.

Suitable alkali metal compounds include compounds that contain sodium, potassium, lithium, rubidium, and cesium. These compounds may be in the form of alkali metal, oxides, hydroxides, carbonates, salts of organic acids, bicarbonates, natural minerals, silicates, etc. and mixtures thereof Suitable alkali earth metal compounds and mixtures thereof include compounds which contain calcium, strontium, magnesium, beryllium, copper, zinc, titanium, zirconium, lead, arsenic, antimony, bismuth, molybdenum, tungsten, manganese, iron, nickel, cobalt, and barium. Suitable ammonium compounds include, but are not limited to, compounds which contain ammonium radical, such as ammonia, amino compounds, e.g., urea, alkyl ureas, dicyanodiamide, melamine, guanidine, aminoguanidine; amines, e.g., aliphatic amines, aromatic amines; organic ammonium salts, e.g., ammonium carbonate, quaternary ammonium hydroxide, ammonium silicate, and mixtures thereof. The ammonium compounds may be mixed with the aforementioned basic salt-forming compounds. Other typical anions may include the halide ions of fluorine, chlorine, bromine, iodine, or nitrates, benzoates, acetates, sulfonates, and the like.

The reaction conditions can be set to those typically employed in the manufacture of polyoxyalkylene polyether polyols. Generally, from 0.005 percent to about 5 percent, preferably from 0.005 to 2.0 percent, and most preferably from 0.005 to 0.5 percent by weight of the catalyst relative to the polyether polymer is utilized.

Any catalyst left in the polyether polymers produced according to the invention can be removed by any of the well-known processes described in the art, such as by acid neutralization, adsorption, water washing, or ion exchange. Examples of acids used in the neutralization technique include solid and liquid organic acids, such as acetic acid and 2-ethylhexanoic acid. For ion exchange, phosphoric acid or sulfuric acid may be used. Extraction or adsorption techniques employ activated clay or synthetic magnesium silicates. It is desirable to remove metal cationic contents down to less than 500 ppm, preferably less than 100 ppm, most preferably from 0.1 to 5 ppm.

As for other processing conditions, the temperature at which polymerization of the polyether polymers occurs can range from 80° C. to 160° C., preferably from 100° C. to 140° C. At temperature above 160° C., the product might discolor; and the product tends to develop a higher degree of unsaturation. The reaction can be carried out in a columnar reactor, a tube reactor, or batchwise in an autoclave. In the batch process, the reaction is carried out in a closed vessel under pressure which can be regulated by a pad of inert gas and the feed of alkylene oxides into the reaction chamber. Generally, the operating pressures produced by the addition of alkylene oxide range from 10 to 80 psig. Generating a pressure over 100 psig increases the risk of a runaway reaction. The alkylene oxides can be fed into the reaction vessel as either a gas or a liquid. The contents of the reaction vessel are vigorously agitated to maintain a good dispersion of the catalyst and uniform reaction rates throughout the mass. The course of polymerization can be controlled by consecutively metering in each alkylene oxide until a desired amount has been added. Where a block of a random or a statistical distribution of 1,2-butylene oxide and other alkylene oxides are desired in the polyether polymer, the alkylene oxides may be metered into the reaction vessel as mixtures. Agitation of the contents in the reactor at the reaction temperature is continued until the pressure falls to a low value. The final reaction product may then be cooled, neutralized as desired, and removed.

The polyether polymers of the invention can be prepared in a batchwise process according to the following description. It should be understood that this is merely one method for preparing the polyether polymers of the invention, and other methods would include preparing the polyether polymers in a continuous reactor or a tubular reactor.

In a batch reaction, the charge of initiator and catalyst solution are weighed out and added to an autoclave, which is subsequently sealed and purged with nitrogen. Instead of weighing out and adding an initiator compound, an intermediate low molecular weight pre-made polyether polymer of propylene oxide added onto the initiator compound can be added to the autoclave. The scope of the invention, however, includes the addition of propylene oxide onto an initiator, whether such addition occurs solely in the main reactor or in two stages by the formation of an intermediate with subsequent addition or more alkylene oxide in the main reactor.

Residual water contained in the initiator or the intermediate low molecular weight polyether polymer, and water formed by the reaction of the hydroxide anion on the catalyst and the hydrogen atom on the initiator or intermediate compound, should be stripped from the reaction mixture. Stripping should occur at approximately the boiling point of water and at a reduced pressure. Subsequently, the autoclave may be re-pressurized with nitrogen and slowly heated to a reaction temperature appropriate for the addition of propylene oxide. Typically, this reaction temperature will range from about 100° C. to 120° C. Propylene oxide is then added slowly over a period of time without letting the pressure build up beyond about 80 psig, and preferably not more than 90 psig. The feed rate of propylene oxide should be sufficiently slow to avoid terminal allylic unsaturation to the extent possible, yet added sufficiently quickly to optimize production time. The time can vary from one hour to ten hours depending on the size of the reaction vessel and the overall amount of propylene oxide added. Propylene oxide can be added continuously or step wise, and in a linear or at an exponentially decreasing or increasing rate.

The contents of the autoclave continue to be heated for a time sufficient to react out substantially all of the propylene oxide. Subsequently, the autoclave should be evacuated to purge any unreacted propylene oxide, after which nitrogen is re-introduced to pressurize the reactor once again. The reactor then may be heated at the same or higher temperature than used for the addition of propylene oxide when adding 1,2-butylene oxide and/or mixtures of 1,2-butylene oxide and other alkylene oxides which do not tend to form terminal allylic unsaturation. Since the alkylene oxides added at this step do not form allylic unsaturation, the reaction temperature and rate of addition may be higher than the reaction temperature and feed rate, set during propylene oxide addition. Once again, at this stage, the added alkylene oxides are reacted out over a period of time, the autoclave is evacuated to purge any unreacted alkylene oxides, and re-pressurized with nitrogen and heated during the addition of pure ethylene oxide if one desires to produce a polyether polymer having an oxyethylene cap. Once all the alkylene oxides have been added and reacted, the autoclave is cooled and evacuated, and the contents are subsequently discharged to a container flushed with an inert gas.

The residual catalysts and the polyols can be neutralized by an organic acid such as phosphoric acid, sulfuric acid, acetic acid, solid organic acids; removed by the carbon dioxide finishing procedure described in Japanese Patent 55-092773-A; or treated with an adsorber such as magnesium silicate or an activated clay. Any residual water remaining after removal of the catalyst should be stripped from the polyether polymer under an inert gas. Subsequently, the polyether polymer can be cooled and stabilized with well-known conventional polyether polyol stabilizers. Once stabilized, the polyether polymer may be exposed to atmospheric oxygen.

The invention further relates to new elastomers, sealants and adhesives. The polyether polymers of the invention can be used in a wide variety of applications, and the equivalent weight of the polyether polymer will vary depending upon the application. Since terminal allylic unsaturation is not very noticeable at equivalent weights of less than 800, the polyether polymers usually will have equivalent weights of 1000 or more. Depending upon the particular application, the equivalent weight of the polyether polymer can include weights of 1300 or more, or 2000 or more.

Nominal hydroxyl numbers of the polyether polymers are not limited. For most applications, however, the nominal hydroxyl numbers will range from 15 to 57, preferably from 15 to 38.

In one embodiment of the invention, there is provided an elastomer made with a polyoxyalkylene polyether polymer having within its polymer structure a nucleus of an initiator compound, an internal block of oxypropylene groups, and a second block of oxyalkylene groups, wherein the internal block of oxypropylene groups is between the nucleus of the initiator and the second block of oxyalkylene groups, and further where the second block of oxyalkylene groups contains at least one derivative of a $C_4$ or higher alkylene oxide, and the amount of the internal block of oxypropylene groups is at least 800 equivalent weight based on the weight of all oxyalkylene groups in the polyether. The polyether polymer is preferably a polyether polyol. The initiator compounds used in the manufacture of this polyether polymer for use in elastomers are difunctional compounds or a mixture of difunctional and higher functional compounds such that the mixture would have an average functionality of less than 2.3. It is more preferred that the average functionality of the initiator compounds is 2.1 or less, and most preferably 2.0.

The functionalities can be set by polymerizing alkylene oxides onto a mixture of initiators, or polymerizing alkylene oxides onto a single initiator and mix the resulting polyether polymer with other polyether polymers made using different initiators.

The elastomers may be thermoset or thermoplastic. Elastomers of the invention can be made in the form of films or sheets extruded to any desired thickness. Such films and sheets find applications in conveyor belts, the transport of sand and stone slurry, applications where low permeability is required, abrasion resistant coatings, textile lamination, protective coatings, and liners for hoses such as fire hoses. Other applications include using elastomers for the outer material of ski boots, shoe soles, ice hockey boots, automotive applications such as exterior automotive body parts, bushings, tires, wiper blades, gaskets for wheel components, tubes, membranes, and seals. Still further applications include wheels, vibration dampers, screens for sorting materials, cable sheaving, medical and food industries, hammers, gears, pump chambers, rollers, impellers, door seals, and the like.

Various applications for the sealants described herein are for windshields, hem, thermal brakes, airport runways, highways, joints and building construction, and waterproofing membranes for decks and bridges.

The polyurethane elastomers, sealants, and adhesives of the invention can be prepared by the prepolymer technique or in a one-shot process. The elastomers of the invention can be prepared by a reaction injection molding technique, or in a cast process wherein the polyurethane forming ingredients are mixed together and poured into a heated mold into pressure. Other techniques include conventional hand-mixed techniques and low pressure or high pressure impingement machine mixing techniques followed by pouring polyurethane forming ingredients into molds.

In a one-shot process, the polyether polymer of the invention, catalysts, and other isocyanate reactive components ("B-side" components) are simultaneously reacted with an organic isocyanate ("A-side" components). Once the B-side components are mixed together, the urethane reaction commences; and the ingredients are poured or injected into molds. In a prepolymer technique, all or a portion of the polyether polymer and/or other isocyanate reactive polyols are reacted with a stoichiometric excess of the organic isocyanate to form an isocyanate-terminated prepolymer. The prepolymer is then reacted as an A-side component with any remaining B-side components to form a polyurethane elastomer, sealant, or adhesive. In some cases, all of the isocyanate reactive B-side components are reacted with a stoichiometric excess of organic isocyanate to form a one-component sealant or adhesive. Such isocyanate terminated prepolymers typically have a low free NCO content of 1 weight percent to 15 weight percent. The one-component prepolymers may be cured by water in the form of moisture in the atmosphere or by further addition of water. In other cases, only a portion of the polyether polymer or other polyols are reacted with the stoichiometric excess of organic isocyanate to form an isocyanate terminated prepolymer, which is subsequently reacted with the remainder of the B-side components, including polyols, as a two-component elastomer, sealant, or adhesive.

The free NCO content of the prepolymers used to make the elastomers, sealants, and adhesives of the invention can range from 0.5 weight percent to 30 weight percent, preferably from 1 weight percent to 15 weight percent, more preferably from 1 weight percent to 10 weight percent.

Other ingredients in the B-side polyol composition, besides the polyether polymer of the invention, may include other polyols, chain extenders or curing agents, catalysts, fillers, pigments, u-v stabilizers, and the like.

In addition to using the polyoxyalkylene polyether polymer having a low degree of unsaturation in the polyol composition for the manufacture of elastomer, sealant, or adhesive, other polyols may be mixed into the polyol composition. For example, the addition of polyester polyols may be added to improve the mechanical properties of an adhesive. Polyester polyols tend to improve the tensile strength and modulus of the urethane polymer, which are important considerations in the field of adhesives. For sealants, however, it is preferred to use polyether polyols which are hydrolytically stable and process well due to their lower viscosities. Other polyols that can be employed in addition to the polyoxyalkylene polyether polymers of the invention are hydroxyl terminated hydrocarbons, such as polybutadiene polyols, where a high degree of hydrophobicity is desired. Castor oils and other natural oils may also be employed. In addition, polycaprolactones can be used to increase the tensile strengths of sealants. Other polyether polyols may be added, and it is preferred that these polyether polyols have a low degree of unsaturation to optimize the mechanical properties of the product. For example, those polyether polyols made with either amorphous or crystalline DMC catalysts are suitable, as well as polyether polyols catalyzed by cesium hydroxide.

One-component sealants or adhesives are typically cured by moisture from the air. Two-component sealants, adhesives, and elastomers are typically cured by chain extenders with compounds containing isocyanate reactive hydrogen. Chain extenders may be, and are typically, employed in the preparation of polyurethane elastomers, sealants, and adhesives. The term "chain extender" is used to mean a relatively low equivalent weight compound, usually less than about 250 equivalent weight, having a plurality of isocyanate reactive hydrogen atoms.

Chain-extending agents include water, hydrazine, primary and secondary aliphatic or aromatic diarines, amino alcohols, amino acids, hydroxy acids, glycols, or mixtures thereof. A preferred group of alcohol chain-extending agents includes water, ethylene glycol, 1,3-propanediol, 1,4-butanediol, 1,10-decanediol, o,-m,-p-dihydroxycyclohexane, diethylene glycol, 1,6-hexanediol, glycerine, trimethylol propane, 1,2,4-, 1,3,5-trihydroxycyclohexane, and bis(2-hydroxyethyl) hydroquinone.

Examples of secondary aromatic diamines are N,N'-dialkyl-substituted aromatic diamines, which are unsubstituted or substituted on the aromatic radical by alkyl radicals, having 1 to 20, preferably 1 to 4, carbon atoms in the N-alkyl radical, e.g., N,N'-diethyl-, N,N'-di-sec-pentyl-, N,N'-di-sec-hexyl-, N,N'-di-sec-decyl-, and N,N'-dicyclohexyl-p- and m-phenylenediamine, N,N'-dimethyl-, N,N'-diethyl-, N,N'-diisopropyl-, N,N,'-disec-butyl- and N,N'-dicyclohexyl4,4'-diaminodiphenylmethane and N,N'-di-sec-butylbenzidine.

The amount of chain extender used varies somewhat on the desired physical properties of the elastomer or sealant. A higher proportion of chain extender and isocyanate provides the elastomer or sealant with greater stiffness and heat distortion temperature. Lower amounts of chain extender and isocyanate provide a more flexible elastomer or sealant. Typically, about 2 to 70, preferably about 10 to 40, parts of the chain extender are used per 100 parts of polyether polymer and any other higher molecular weight isocyanate reactive components.

Catalysts may be employed which greatly accelerate the reaction of the compounds containing hydroxyl groups and with the modified or unmodified polyisocyanates. Examples of suitable compounds are cure catalysts which also function to shorten tack time, promote green strength, and prevent foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_n Sn [X-R^1-Y]_2$, wherein R is a $C_1-C_8$ alkyl or aryl group, $R^1$ is a $C_0-C_{18}$ methylene group optionally substituted or branched with a $C_1-C_4$ alkyl group, Y is hydrogen or an hydroxyl group, preferably hydrogen, X is methylene, an —S—, an —$SR^2COO$—, —SOOC—, an —$O_3S$—, or an —OOC— group wherein $R^2$ is a $C_1-C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyl-tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20C) tin dimercaptides, including dimethyl-, dibutyl-, and dioctyl- tin dimercaptides.

Tertiary amines also promote urethane linkage formation, and include triethylamine, 3-methoxypropyldimethylamine, triethylenediamine, tributylamine, dimethylbenzylamine, N-methyl-, N-ethyl- and N-cyclohexylmorpholine, N,N,N', N'-tetramethylethylenediamine, N,N,N', N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

To prevent the entrainment of air bubbles in the sealants or elastomers, a batch mixture may be subjected to degassing at a reduced pressure once the ingredients are mixed together. In a degassing method, the mixed polyurethane formed ingredients can be heated under vacuum to an elevated temperature to react out or volatize residual water. By heating to an elevated temperature, residual water reacts with the isocyanate to liberate carbon dioxide, which is drawn from the mixture by the reduced pressure.

Alternatively, or in addition to the degassing procedure, the polyurethane forming ingredients may be diluted with solvents to reduce the viscosity of the polyurethane forming mixture. Such solvents should be nonreactive and include tetrahydrofuran, acetone, dimethylformamide, dimethylacetamide, normal methylpyrrolidone, methyl ethyl ketone, etc. The reduction in viscosity of polyurethane forming ingredients aid their extrudability. For sealant applications, however, the amount of solvent should be kept as low as possible to avoid deteriorating their adhesion to substrates. Other solvents include xylene, ethyl acetate, toluene, and cellosolve acetate.

Plasticizers may also be included in the A- or B-side components to soften the elastomer or sealant and decrease its brittleness temperature. Examples of plasticizers include the dialkyl phthalates, dibutyl benzyl phthalate, tricresyl phosphate, dialkyl adipates, and trioctylphosphate.

In addition to solvents or plasticizers, other ingredients such as adhesion promoters, fillers, and pigments, such as clay, silica, fume silica, carbon black, talc, phthalocyanine blue or green, titanium oxide, magnesium carbonate, calcium carbonate, and UV-absorbers may be added in amounts ranging from 0 to 75 weight percent, based upon the weight of the polyurethane. Other fillers include dissolved gels, plasticells, graded and coated calcium carbonate, urea solids, the reaction product of hydrogenated castor oils with arines, and fibers.

The organic polyisocyanates are used to prepare the prepolymer, used in a one-shot process, or used for the further processing of hydroxyl terminated prepolymers. The organic polyisocyanates include all essentially known aliphatic, cycloaliphatic, araliphatic and preferably aromatic multivalent isocyanates. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, mixtures of 4,4'- and 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3.3'-dimethyldiphenylmethane4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate, and mixtures thereof. Especially usefull due to their availability and properties are 4,4'-diphenylmethane diisocyanate, polymethylene polyphenylene polyisocyanate, or mixtures thereof for rigid foams, or a mixture of the foregoing with toluene dilsocyanates for semi-rigid foams.

Crude polyisocyanates may also be used in the compositions of the present invention, such as crude toluene diisocyanate obtained by the phosgenation of a mixture of toluenediamines or crude diphenylnethane isocyanate obtained by the phosgenation of crude diphenylmethane diamine. The preferred or crude isocyanates are disclosed in U.S. Pat. No. 3,215,652.

In one embodiment of the invention, there is provided an isocyanate-terminated prepolymer suitable for the preparation of sealants and adhesives. This isocyanate-terminated prepolymer may be prepared by reacting the stoichiometric excess of organic isocyanate with a mixture of a polyoxyalkylene polyether triol and a polyoxyalkylene polyether diol. Either one or both of the triol and diol are the polyoxyalkylene polyether polymers described herein, that is, containing an internal block of oxypropylene groups and a second block of oxyalkylene groups derived from a $C_4$ or higher alkylene oxide, preferably butylene oxides or a mixture of butylene oxide and ethylene oxide. In a preferred embodiment, it is the polyoxyalkylene polyether triol which is the polyether polymer described according to the invention. The equivalent ratio of NCO/OH groups should be set at from 1.01/1 to about 10/1, more preferably from about 1.2/1 to about 2.5/1, to make the isocyanate-terminated prepolymers of this embodiment. Also, in this embodiment, the equivalent weight of the polyoxyalkylene polyether diol should range from about 250 to about 7000, and that of the polyoxyalkylene polyether triol ranging from 1300 or more, or preferably 1600 or more. Of course, other isocyanate reactive compounds having functionalities greater than 3 can be used in mixture with the diols and triols in the manufacture of the isocyanate-terminated prepolymer.

Once the isocyanate-terminated prepolymer is made, the sealant or the adhesive may be prepared by moisture curing the prepolymer if the free NCO content is low enough, or by reacting the prepolymer with further higher molecular weight polyoxyalkylene polyether polyols or amine-terminated polyoxyalkylene polyethers, chain extenders, catalysts, fillers, etc. For most specific applications employing sealants, the isocyanate-terminated prepolymer is moisture cured.

In another embodiment of the invention, there is provided a hydroxyl terminated prepolymer suitable for the manufacture of sealants and adhesives. This embodiment, a stoichiometric deficiency of organic isocyanate is reacted with a polyoxyalkylene polyether polymer of the invention, and optionally other polyols or other isocyanate reactive compounds, at NCO-OH equivalent ratios of 0.99:1 or less, and even at 0.90:1 or less, or 0.85:1 or less. The hydroxyl terminated prepolymer may then be mixed with other B-side ingredients such as other polyols, chain extenders, catalysts, surfactants, or fillers, for reaction with further organic isocyanate to make a sealant or adhesive. The purpose for making a hydroxyl terminated prepolymer may be to adjust the viscosity of the B-side components if a thicker composition is desired for a given application. As in the above-described embodiment, the B-side components may comprise a mixture of triols and diols reacted with the sub-stoichiometric amount of organic isocyanate. Either one of or both of the diol or triol may be manufactured according to the method described herein.

In yet a further embodiment of the invention, there is provided isocyanate terminated prepolymers suitable for the manufacture of elastomers, and elastomers made with the polyoxyalkylene polyether polymers of the invention. Elastomers of the invention can be made by the one-shot or the prepolymer technique. In the prepolymer technique, there may be provided a prepolymer having a free NCO content of from 1 weight percent to 30 weight percent, usually from 1 weight percent to 10 weight percent. The prepolymer may be manufactured by reacting a stoichiometric excess of organic isocyanate with a polyoxyalkylene polyether diol, or a mixture of a polyether diol and a polyether triol having an average functionality of less than 2.3. One or both of the polyether diol and triol are manufactured according to the invention described herein. Preferably, a polyoxyalkylene polyether diol having an internal block of the oxypropylene groups and a second block of $C_4$ or higher alkylene oxides such as oxybutylene or a mixture of oxybutylene and oxyethylene groups is reacted with a stoichiometric excess of organic isocyanate at an NCO-OH equivalent ratio of 1.01:1 to 10:1. The polyoxyalkylene polyether diol is preferably terminated with oxyethylene groups to increase its reactivity with the organic isocyanate. The isocyanate terminated prepolymer may then be reacted with further B-side components such as polyether polyols, chain extenders, catalysts, and other nonreactive ingredients. Alternatively, the isocyanate terminated prepolymer may be moisture cured in the presence of a catalyst to accelerate the cure rate. The polyether diols used in the manufacture of elastomers have equivalent weights ranging from 250 to about 7000. When the equivalent weight of the polyether diol is about 1000 or more, the diol should be manufactured according to the process as described herein to reduce terminal allylic unsaturation.

Shore A hardness of the sealants, adhesives, and elastomers made according to the invention can vary widely depending upon the ultimate application. Shore A hardness can range from 0 to about 95. For most applications, however, Shore A hardness of sealants and adhesives will range from 0 to 40, most typically from 0 to 20. In most elastomer applications, the Shore A hardness will range from to 20 to 95, with values of 50 to 90 being quite common. In some elastomeric applications, the elastomer will have a Shore D hardness of 55 to 75.

The following examples illustrate some of the embodiments of the invention.

Preparation of Intermediate A 162.5 pounds of trimethylolpropane and 1.62 pounds of 90%KOH was charged to a clean dry autoclave filled with nitrogen. After the charge, the agitator was started slowly and advanced to 150 rpm, and the autoclave was heated to 65–70° C. The reactor was sealed, purged three times with nitrogen, and vented to about 0.25 bar. Subsequently, the contents were heated to 125° C., vented to 0.15 bar, the 735.88 pounds of propylene oxide were added over about an 8 hour period at less than 6.2 bar. The contents were further reacted for 3 hours, after which a vacuum was applied and the pressure reduced to 13 mb at 125° C. The vacuum was then relieved to about 1 bar with nitrogen, cooled to about 90° C., and the contents transferred to a filter-stripper tank.

Once the crude product has been transferred to the filter-stripper tank, 25 pounds of MAGNESOL® is added to the crude polyol, after which the filter-stripper tank was sealed and purged three (3) times at 3.5 bar with nitrogen. The final purge was vented to one bar. The crude product was treated in the filter-stripper tank at 90° to 95° C. for one (1) hour. Subsequently, the treated product was recycled through the filter press until we attained haze-free clarity and less than 20 ppm of NaK. The product was then transferred from the filter-stripper tank through the filter press into a flash-stripper tank. The polyol product was stripped of water at 105° C. and less than 13 mb for 60 minutes until the water content was less than 0.05 percent after vacuum stripping. Subsequently, the vacuum was relieved with nitrogen gas; and stabilizer was added to the filtered, stripped product. The intermediate product was subsequently cooled. This intermediate product is designated as intermediate A.

EXAMPLE 1—Polyol A

This Example describes the preparation of a low unsaturation block PO-[BO-EO het]-EO polyether triol using a conventional KOH catalyst.

552.9 grams (0.75 moles) of intermediate A and 30.6 grams (0.25 moles) of a 45 percent KOH solution, were charged into a clean dry autoclave. The autoclave was sealed, and the agitator started. The autoclave was purged three (3) times with nitrogen and subsequently heated to 105° C. while slowly evacuating to a pressure of less than 10 mm Hg. The contents were batch stripped for two (2) hours. Subsequently, the vacuum was relieved to 0 psig with nitrogen; and the autoclave was then heated to 110° C. Propylene oxide was then added at 110° C. at less than 90 psig over a seven-hour period. The contents were reacted for an additional four (4) hours at 110° C. Subsequently, the reactor was evacuated to 10 mm Hg and again heated to 125° C. and pressurized to 10 psig. A bomb of mixed butylene oxide/ethylene oxide was charged to the autoclave at 125° C. and less than 75 psig over a two (2) hour period. The amount of butylene oxide and ethylene oxide added was 706.5 grams (9.8 moles) and 464.3 grams (10.55 moles), respectively. The contents were reacted for one more hour at 125° C., and subsequently the autoclave was evacuated at 10 mm Hg. Once evacuated, the autoclave was again re-pressurized to 34 psig with nitrogen, and 242.2 grams of ethylene oxide was charged into the autoclave at less than 90 psig at 125° C. over a one-hour period. The contents were reacted for approximately one more hour at a constant pressure. Finally, the autoclave was evacuated at 10 mm Hg for thirty minutes, the contents were cooled to 60° C., and then discharged to a nitrogen-flushed container.

The polyether polyol was treated with 3 percent MAG-NESOL® and 1.5 percent water at 95° C. for one-and-a-half hours. The product was recycled through a filter press until haze-free, and then stripped of water at 110° C. and less than 10 mm Hg for one (1) hour. The treated product was then cooled to 60° C. and stabilized with a common stabilizer package.

Chemical analysis of the polyether product revealed that the polyol had a hydroxyl number of 27.5 and a degree of unsaturation of 0.055. The compatibility index was 6° C.

The structure of the final polyether polyol corresponded to a nucleus of a trimethylolpropane initiator molecule covalently bonded to a block of oxypropylene groups across the hydroxyl functionalities of the initiator molecule, and a block of mixed oxybutylene and oxyethylene groups attached to the block of oxypropylene groups, and terminated with a block of oxyethylene groups. Based on the weight of all alkylene oxide and initiator charges, the polyether polymer had about 75 weight percent of oxypropylene groups, 20 weight percent of a block of randomly mixed oxybutylene groups and oxyethylene groups, and about 5 weight percent of a terminal block of oxyethylene groups.

EXAMPLE 2

This example illustrates the manufacture of a low unsaturation PO-[BO-EO het]-EO polyether triol manufactured using cesium hydroxide as a catalyst.

The same procedure as employed in the manufacture of Polyol A in Example 1 above was used to manufacture the polyol of this example, Polyol B, with the following noted exceptions. The charges of each ingredient were as follows:

588.9 grams of Intermediate Polyol A, 79.1 grams of a 50 percent cesium hydroxide solution, and 3610.7 grams of propylene oxide.

In the step of making the block of randomly mixed oxybutylene and oxyethylene groups, the charges were 699.9 grams of butylene oxide and 431.2 grams of ethylene oxide. In the step for capping the polyether polymer with oxyethylene groups, 268.8 grams of ethylene oxide were added.

In the process for the manufacture of the polyether polymer polyol B, the following manufacturing steps differed as follows from Example 1:

Propylene oxide in this case was reacted for 4.5 hours at 110° C. instead of 4 hours. The mixed oxides of butylene oxide and ethylene oxide were reacted for two (2) hours instead of one (1) hour.

The resulting polyether polymer polyol B had a hydroxyl number of 27 a degree of unsaturation of 0.03 and a compatibility index of about 5° C. Based upon the weight of the alkylene oxide and initiator charges added, the polyether polymer contained about 75 weight percent of a block of oxypropylene groups, 20 weight percent of a block of randomly mixed oxyethylene groups and oxybutylene groups, and about 5 weight percent of a terminal block of oxyethylene.

EXAMPLE 3

This example illustrates the manufacture of sealants employing low unsaturation PO-[BO-EO het]-EO polyether polymers made with a variety of catalysts.

Table 1 sets forth the results obtained from an evaluation of 14 different polyether triols employed in the preparation of sealants. Examples 1 and 12 through 14 are comparison examples. Each of the polyols 2 through 11 were prepared according to the procedures of Examples 1 or 2. Those polyether polymer triols using potassium hydroxide as a catalyst were prepared in accordance with Example 1, while those triols prepared with cesium hydroxide as a catalyst were prepared in accordance with Example 2. The charges of propylene oxide, butylene oxide, and ethylene oxide were adjusted to correspond with the stated weight percentage of oxypropylene groups set forth in the table below. Each of the triols 2 through 14 were terminated with a cap of 5 weight percent of oxyethylene groups. The amount of butylene oxide and ethylene oxide charged to form the block of randomly distributed oxyethylene groups and oxybutylene groups was measured either on a 1:1 weight basis or a 1:1 mole basis, as stated in the table.

The water test was conducted by immersing the sealant for thirty (30) days at 70° C. in a bath of water. The sealant was then removed from the water and its tensile properties measured according to ASTM D412. A "Y" indicates the retention of greater than 50 percent of the original tensile strength of the sealant prior to immersion in the water bath, while "N" indicates no significant retention of original tensile strength properties.

The polyols of comparative examples 12–14 were prepared using the listed catalysts, and each had average molecular weights of about 6200, with a terminal cap of oxyethylene groups in an amount of about 5 weight percent.

The following procedure was used to prepare the sealants. A prepolymer was prepared by reacting an organic isocyanate with a mixture of polyols. The mixture of polyols was made up of 0.249 equivalents of Polyol C and 0.249 equivalents of each of Polyols 1–14 in separate batches. Polyol C is a propylene oxide adduct of propylene glycol having a hydroxyl number of about 56. Each of the polyol blends were de-gassed, then dried under reduced pressure at 95° C. for two (2) hours and then cooled to 40° C. Toluene diisocyanate, commercially available from BASF Corporation as LUPRANATE T80-1, was heated to 40° C. in a reaction flask under a constant nitrogen sparge. One of the polyol blends was added to one (1) equivalent of the heated toluene diisocyanate as quickly as possible, keeping the resulting exothermic reaction at or below 60° C. Once the polyol blend was fully added, the mixture was heated to 80° C. and kept at that temperature for 1.5 hours. The free NCO percent was then measured by titration. This procedure was repeated for each polyol batch.

Each prepolymer was mixed with Polyol D at a ratio of 1:1 equivalents based on the percent NCO of the prepolymer, 25 weight percent of talc filler, 3 drops of silicone surfactant DC-200, and 0.5 weight percent of dibutyltin dilaurate catalyst. Polyol D was a propylene oxide adduct of propylene glycol having an OH number of about 107. These ingredients were mixed, de-gassed under reduced pressure, and then poured into a ¼" mold and cured at 70° C. for four hours. The resulting plaques were post-cured for two weeks at ambient temperature, 50 percent relative humidity before testing. The results of the evaluations are described in the table below.

The CI is a temperature at which the triol fell out of solution with water, and 100 percent and 300 percent are the modulus measurements at 100 percent elongation and 300 percent elongation, respectively, according to ASTM D412.

cure. In contrast, the triols prepared with potassium hydroxide catalyst and a second block comprising at least oxybutylene groups, capped with ethylene oxide, cured well and exhibited improved tensile properties. Not only did the inventive triols prepared with KOH have much lower degrees of unsaturation than the propylene oxide polyether polyol 12 prepared with KOE, but they also had lower degrees of unsaturation than all propylene oxide polyether polyols made with cesium hydroxide catalysts shown in Example 13, and were on par with the tensile properties of the triols prepared with double metal cyanide catalysts. For the most part, the sealants prepared using the inventive triols retained their physical properties under the water immersion test. The inventive triols were also sufficiently hydrophobic as demonstrated by the low temperatures at which the triols fell out of solution with water. In contrast, the polyether polyol prepared with only butylene oxide and ethylene oxide according to comparative example 1 was too hydrophilic as shown by its high CI value.

In sum, we dramatically reduced the degree of unsaturation of polyether polyols suitable for the preparation of sealants and elastomers without employing an exotic and expensive catalyst such as DMC, while simultaneously improving the hydrophobicity and tensile strength characteristics of the polyether polyol and the resultant sealant. The polyether polyols of the invention also advantageously afford tremendously wide processing and formulating windows while retaining improved degrees of unsaturation and mechanical properties. For example, the ratio of butylene oxide and ethylene oxide in the block, as well as the overall

TABLE 1

6,200 MW, PO/BO/EO TRIOLS EVALUATED IN CONSTRUCTION SEALANTS

| % PO (WT.) | CATALYST | UNSATURATION | MOLE/WT. (BO/EO) | CI ° C. | 100% MODULUS (psi) | 300% MODULUS (psi) | SHORE A | WATER TEST* |
|---|---|---|---|---|---|---|---|---|
| 1) 0 (BO/EO) | KOH | .006 | WT. | 53 | 52 | 102 | 21 | Y |
| 2) 50 | KOH | .021 | WT. | 24 | 25 | 46 | 11 | N |
| 3) 50 | KOH | .02 | MOLE | 7 | 31 | 61 | 8 | Y |
| 4) 65 | KOH | .038 | WT. | 16 | 21 | 37 | 10 | N |
| 5) 65 | KOH | .037 | MOLE | −2 | 30 | 55 | 8 | Y |
| 6) 65 | CsOH | .027 | WT. | 13 | 29 | 58 | 14 | Y |
| 7) 65 | CsOH | .022 | MOLE | 3.5 | 20 | 37 | 7 | Y |
| 8) 75 | KOH | .055 | WT. | 6 | 33 | 62 | 15 | Y |
| 9) 75 | KOH | .047 | MOLE | 3 | 43 | 83 | 13 | Y |
| 10) 75 | CsOH | .03 | WT. | 5 | 34 | 67 | 16 | Y |
| 11) 75 | CsOH | .028 | MOLE | 5 | 37 | 68 | 9 | Y |
| 12) 95 | KOH | .100 | NONE | <4 | NO CURE | NO CURE | 0 | NO CURE |
| 13) 95 | CsOH | .050 | NONE | <4 | 18 | 31 | 6 | Y |
| 14) 95 | DMC | .020 | NONE | <4 | 54 | 42 | 12 | Y |

*WATER TEST: TOTAL IMMERSION FOR 30 DAYS AT 70 C., THEN RUN TENSILE.
Y = RETENTION OF >50% OF ORIGINAL PROPERTIES.
N = NO SIGNIFICANT RETENTION OF PROPERTIES.

The data generated from the evaluation of inventive examples 2–11 demonstrates a reduction in the degree of unsaturation of each triol when compared with conventional triols prepared with either potassium hydroxide or cesium hydroxide as in examples 12 and 13. Thus, while each triol had a molecular weight of about 6200, those triols prepared with an internal block of 25 to 80 percent oxypropylene groups followed by a block of randomly distributed oxybutylene and oxyethylene groups and capped with ethylene oxide, had a degree of unsaturation much lower than similar molecular weight polyether polyols prepared with the same catalyst using only propylene oxide and a cap of ethylene oxide. When used in the manufacture of a sealant, the triol of Example 12 prepared with potassium hydroxide and all propylene oxide with an ethylene oxide cap was not able to amount of butylene oxide, can be widely varied to obtain the desired degree of hydrophobicity. The process is also not dependant upon removing catalysts prior to addition of an ethylene oxide cap as in the case of DMC catalysts. It could not be foreseen that a high equivalent weight polyether polyol using potassium hydroxide as a catalyst could be manufactured with low degrees of unsaturation or could be used to prepare a polyurethane sealant or elastomer having improved physical properties.

EXAMPLE 4

This example illustrates how the polyether diol having a low degree of unsaturation was made.

Diols are frequently used in the manufacture of elastomers. To enhance their reactivity, diols frequently have a high weight percent of an oxyethylene cap. Accordingly, this example illustrates how a polyether diol having a low degree of unsaturation and high equivalent weight was made.

An intermediate B was manufactured by charging 1397.7 grams of dipropylene glycol and 732.5 grams of a 50% solution of cesium hydroxide catalyst to a clean dry autoclave. The autoclave was sealed, agitation initiated, and purged three times with nitrogen. The autoclave was heated to about 105° C. and evacuated at less than 10 mm Hg to strip water for about one hour. The vacuum was relieved to 0 psig with nitrogen, after which 3102.3 grams of propylene oxide was added at 105° C., less than 90 psig, and over a four and one-half hour period. After addition of propylene oxide was completed, the reaction proceeded for another hour at the same temperature. The autoclave was then evacuated, the volatiles stripped, and the reaction mixture cooled to 60° C. The contents were discharged to a nitrogen flush container.

781.6 grams of intermediate B were added to a separate, dry, clean autoclave. The autoclave was sealed, agitation initiated, and the autoclave was purged three times with nitrogen. The autoclave was then heated to about 105° C., and slowly evacuated to strip volatiles. Once stripped, the vacuum was relieved with nitrogen after which 2510.7 grams of propylene oxide were added over a five hour period, keeping the pressure to less than 90 psig. Once the addition was complete, the reaction continued for another three hour period. Subsequently, the autoclave was evacuated to collect any unreacted propylene oxide volatiles, after which it was re-pressurized to 0 psig with nitrogen. The reactor was then heated to about 125° C. A mixture of 670.7 grams of butylene oxide and 409.3 grams of ethylene oxide were simultaneously added to the autoclave at 125° C. over a two and one-half hour period at less than 75 psig. The reaction continued for about four and one-half hours, after which it was evacuated to collect any remaining volatiles. Once the autoclave was re-pressurized, about 1080.0 grams of ethylene oxide were be added at 125° C. over a two hour period and at less than 90 psig. The ethylene oxide was reacted to a constant pressure over a one hour period, after which the autoclave was evacuated for about a half an hour to collect any volatiles. The contents in the reaction in the autoclave were cooled to 60° C. and discharged to a nitrogen flushed container.

The resulting polyether polyol was treated with a 3% Magnasol® absorber and a 1.5% water at about 95° C. for one and one-half hours, recycled through a filter press, stripped, and stabilized with conventional stabilizers.

The resulting polyether polyol was subjected to analysis which showed that the polyether polymer was made of an internal block of 60 weight percent oxypropylene groups, a 20 weight percent block of randomly distributed oxybutylene and oxyethylene groups in a 1 to 1 molar ratio, and a 20 weight percent terminal block of oxyethylene groups. The resulting polyether polymer had an equivalent weight of about 1500, an OH number of about 37.3, and a compatibility index of greater than 70° C. Remarkably, the level of unsaturation was only 0.014.

EXAMPLE 5

This example will demonstrate the level of unsaturation for about a 2000 equivalent weight polyether diol suitable for the manufacture of elastomers, employing cesium hydroxide as a catalyst.

The same procedure as used in example 4 above was employed here. The only difference in charges were 590.8 grams of intermediate B, and 2688.9 grams of propylene oxide. The resulting polyether polymer diol had an internal block of 60 weight percent oxybutylene groups, a 20 weight percent block of randomly distributed oxybutylene and oxyethylene groups in a 1 to 1 molar ratio, and a 20 weight percent terminal block of oxyethylene groups. Analysis showed that the polyether diol had an OH number of about 28.6, which corresponds to a calculated equivalent weight of about 1960, and a compatibility index of greater than 70° C. Remarkably, the level of unsaturation for this high equivalent weights polyether diol was only 0.019.

In examples 6–7, several 1500 equivalent weight polyether polyols were manufactured using different catalysts and having different structures.

EXAMPLE 6

An intermediate C was manufactured by charging 847.8 grams of dipropylene glycol and 102.5 grams of a 50% solution of cesium hydroxide catalyst to a clean dry autoclave. The autoclave was sealed, agitation initiated, and purged three times with nitrogen. The autoclave was heated to about 105° C. and evacuated at less than 10 mm Hg to strip water for about one hour. The vacuum was relieved to 0 psig with nitrogen, after which 1902.7 grams of propylene oxide were added at 105° C. at less than 90 psig and over a four hour period. After the addition of propylene oxide was completed, the reaction was continued for another hour at the same temperature. The autoclave was then evacuated, the volatiles stripped for 30 minutes, and the vacuum relieved with nitrogen. The contents were discharged to a nitrogen flush container. The OH number was about 251.6, the gardner color was about 1, and the wt. % of cesium hydroxide was about 1.8.

In a separate dry clean autoclave, 747.7 grams of intermediate C and 71.0 grams of a 50% cesium hydroxide solution were added. The same procedure as in Example 4 was employed, except that the amount of propylene oxide added was 2517.2 g, the amount of ethylene oxide added as the heteric block was 540 g, the amount of butylene oxide added was 540 g, and the amount of ethylene oxide added as the terminal cap was 1080.0 g.

The resulting polyether polyol 6 was subjected to analysis which showed that the polyether polymer was made of an internal block of 60 weight percent oxypropylene groups, a 20 weight percent block of randomly distributed oxybutylene and oxyethylene groups in a 1 to 1 weight ratio, and a 20 weight percent terminal block of oxyethylene groups. The resulting polyether polymer had an equivalent weight of about 1500, an OH number of about 37, and a compatibility index of greater than 70° C. Remarkably, the level of unsaturation was only 0.014.

EXAMPLE 7

This polyether polyol was prepared with a standard KOH catalyst as a low unsaturation 1500 equivalent weight polyol.

Intermediate D was prepared by adding about 35 moles of propylene glycol to a dry, nitrogen filled reactor, and heated to 120F. A 45% solution of KOH was added, mixed at less than 140F and 50 psig. Upon addition of about 294 moles of propylene oxide to the reactor, the heat was increased to 257F and held during the reaction. Upon completion of the reaction, the contents were cooled to 150F and discharged to storage.

700.3 grams of Intermediate D was charged along with 18 grams of KOH into a clean dry autoclave, sealed, and agitated. After purging, the autoclave was heated to 105C and depressurized to less than 10 mm Hg for stripping off water. The same procedure was used for the remainder of the reaction as empolyed in Example 4 with the following further modifications: 2686.2 g of propylene oxide were added over a 6 hour period and reacted for 3 more hours, after which the autoclave was evacuated for 30 minutes instead of 10 minutes; the mixed oxides of ethylene and butylene were added at a 1:1 weight ration of 560:560 grams over a 1.5 hour period and reacted for 3 more hours after which the autoclave was depressurized for 10 minutes; and 1120 g of ehtylene oxide were added as a cap over a 1.5 hour period and reacted for 1 more hour. The polyol was stabilized by the same procedure.

The resulting polyether polyol had an OH number of 37, an acid number of 0.004, a level of unsaturation of 0.02, and a CI of greater than 70C in a 50/50 isopropyl/water ratio. The polyether polymer was 1500 equivalent weight difunctional polyol with a 60 wt. % polyoxypropylene internal block, a 20 wt. % block of randomly mixed polyoxyethylene and polyoxybutylene groups, and a 20 wt. % cap of polyoxyethylene groups.

What is claimed is:

1. A method of forming a sealant comprising the steps of:
   a) forming a first polyol mixture of polyoxyalkylene polyethers having an initiator nucleus attached to a plurality of oxyalkylenes forming a plurality of internal blocks comprising at least 95% by weight of oxypropylene by reacting an initiator or a mixture of initiators, each of the initiators having at least two hydrogens reactive to alkylene oxides and the mixture of initiators having a functionality between 2.3 and 3.0, with a cesium catalyst and propylene oxide or a first mixture of oxyalkylene monomers comprising at least 95% by weight of propylene oxide, and continuing the reaction provided that the unsaturation level of the polyol mixture remains less than or equal to 0.06 meq/g of KOH;
   b) forming a second polyol mixture comprising the structure formed in step a) with the addition of a plurality of oxyalkylenes attached to the plurality of internal blocks to form a plurality of external blocks having terminal isocyanate reactive hydrogens by reacting the first polyol mixture formed in step a) with a second mixture of oxyalkylene monomers comprising at least 5.0% by weight of oxyalkylene monomers of $C_4$ or higher and a cesium catalyst, the reaction continued provided that the unsaturation level of the second polyol mixture remains less than or equal to 0.06 meq/g KOH and the weight percentage of oxypropylene in the internal blocks is between 25 to 80% based on the total weight of all the oxyalkylenes and the initiator or mixture of initiators;
   c) forming an isocyanate terminated prepolymer composition by reacting the products formed in step b) with a stoichiometric excess of a polyisocyanate or a mixture of polyisocyanates; and
   d) forming a sealant by reacting the prepolymer formed in step c) with a chain extender having a plurality of isocyanate reactive hydrogens.

2. A method as recited in claim 1, wherein step a) comprises reacting between 0.005 and 5.0% by weight of the cesium catalyst with the initiator or mixture of initiators and the propylene oxide or the first mixture of oxyalkylene monomers to form the first polyol mixture; and step b) comprises reacting between 0.005 and 5.0% by weight of the cesium catalyst with the first polyol mixture and the second mixture of oxyalkylene monomers to form the second polyol mixture.

3. A method as recited in claim 1, wherein the cesium catalyst comprises cesium hydroxide; step a) comprises reacting the cesium hydroxide with the initiator or mixture of initiators and the propylene oxide or the first mixture of oxyalkylene monomers to form the first polyol mixture; and step b) comprises reacting the cesium hydroxide with the first polyol mixture and the second mixture of oxyalkylene monomers to form the second polyol mixture.

4. A method as recited in claim 1, wherein step a) comprises reacting an initiator or mixture of initiators having an equivalent weight of less than 400, between 2 to 6 carbon atoms, and a functionality between 2.3 to 3.0 with the cesium catalyst and the propylene oxide or the first mixture of oxyalkylene monomers to form the first polyol mixture.

5. A method as recited in claim 1, wherein step b) comprises reacting the first polyol mixture with the cesium catalyst and the second mixture of oxyalkylene monomers, the reaction produced that until the unsaturation level of the second polyol mixture is less than or equal to 0.06 meq/g KOH, the weight percentage of oxypropylene in the internal blocks is between 25 to 80% based on the total weight of all the oxyalkylenes and the initiator or mixture of initiators, and the weight percent of the external blocks is between 5% to 75% based on the total weight of all the oxyalkylenes and the initiator or mixture of initiators.

6. A method as recited in claim 1, further comprising after step b) and before step c) the further step of reacting the second polyol mixture with ethylene oxide to form a terminal ethylene oxide cap on the structure formed in step b).

7. A method as recited in claim 6, wherein the further step of reacting the second polyol mixture with ethylene oxide to form a terminal ethylene oxide cap on the structure formed in step b) is continued until the weight of the terminal ethylene oxide cap is between 4 and 25% by weight based on the total weight of all the oxyalkylenes and the initiator or mixture of initiators.

8. A method as recited in claim 1, wherein the second mixture of oxyalkylene monomers comprises a mixture of butylene oxide and ethylene oxide with at least 5.0% by weight of the oxyalkylene monomers being $C_4$ or higher and step b) comprises reacting the second mixture of oxyalkylene monomers with a cesium catalyst and the first polyol mixture formed in step a), the reaction continued provided that the unsaturation level of the second polyol mixture remains less than or equal to 0.06 meq/g KOH and the weight percentage of oxypropylene in the internal blocks is between 25 to 80% based on the total weight of all the oxyalkylenes and the initiator or mixture of initiators.

9. A method as recited in claim 8, wherein the second mixture of oxyalkylene monomers comprises 1,2-butylene oxide and ethylene oxide mixed in a ratio of between 0.5:1 to 4:1, respectively and step b) comprises reacting the second mixture of oxyalkylene monomers with a cesium catalyst and the first polyol mixture formed in step a), the reaction continued provided that the unsaturation level of the second polyol mixture remains less than or equal to 0.06 meq/g KOH and the weight percentage of oxypropylene in the internal blocks is between 25 to 80% based on the total weight of all the oxyalkylenes and the initiator or mixture of initiators.

10. A method as recited in claim 1, wherein step c) a sufficient stoichiometric excess of a polyisocyanate or a mixture of polyisocyanates is used to produce a prepolymer composition having a free NCO level of between 0.5 to 30% by weight based on the total weight of the prepolymer.

11. A method as recited in claim 1, wherein step b) is continued until the equivalent weight of the polyether polyols formed in step b) are greater than or equal to 1500 Daltons.

12. A method as recited in claim 1, wherein the chain extender comprises a diol, a triol, a tetraol, or mixtures thereof; and step d) comprises forming the sealant by reacting the prepolymer formed in step c) with the chain extender.

13. A method as recited in claim 12, wherein the chain extender comprises a diol, a triol, a tetraol, or mixtures thereof having equivalent weights that are less than 250; and step d) comprises forming the sealant by reacting the prepolymer formed in step c) with the chain extender.

14. A method of forming a sealant comprising the steps of:
   a) forming a first polyol mixture of polyoxyalkylene polyethers having an initiator nucleus attached to a plurality of oxyalkylenes forming a plurality of internal blocks comprising at least 95% by weight of oxypropylene by reacting an initiator or a mixture of initiators, each of the initiators having at least two hydrogens reactive to alkylene oxides and the mixture of initiators having a functionality between 2.3 and 3.0, with a catalyst comprising cesium hydroxide and with propylene oxide or a first mixture of oxyalkylene monomers comprising at least 95% by weight of propylene oxide, and continuing the reaction provided that the unsaturation level of the polyol mixture remains less than or equal to 0.06 meq/g of KOH;
   b) forming a second polyol mixture comprising the structure formed in step a) with the addition of a plurality of oxyalkylenes attached to the plurality of internal blocks to form a plurality of external blocks having terminal isocyanate reactive hydrogens by reacting the first polyol mixture formed in step a) with a second mixture of oxyalkylene monomers comprising at least 5.0% by weight of oxyalkylene monomers of $C_4$ or higher and the cesium hydroxide catalyst, the reaction continued provided that the unsaturation level of the second polyol mixture remains less than or equal to 0.06 meq/g KOH and the weight percentage of oxypropylene in the internal blocks is between 25 to 80% based on the total weight of all the oxyalkylenes and the initiator or mixture of initiators;
   c) forming an isocyanate terminated prepolymer composition by reacting the products formed in step b) with a stoichiometric excess of a polyisocyanate or a mixture of polyisocyanates; and
   d) forming a sealant by reacting the prepolymer formed in step c) with a chain extender having a plurality of isocyanate reactive hydrogens.

15. A method as recited in claim 14, wherein step a) comprises reacting between 0.005 and 5.0% by weight of the cesium hydroxide catalyst with the initiator or mixture of initiators and the propylene oxide or the first mixture of oxyalkylene monomers to form the first polyol mixture; and step b) comprises reacting between 0.005 and 5.0% by weight of the cesium hydroxide catalyst with the first polyol mixture and the second mixture of oxyalkylene monomers to form the second polyol mixture.

16. A method as recited in claim 14, wherein step a) comprises reacting an initiator or mixture of initiators having an equivalent weight of less than 400, between 2 to 6 carbon atoms, and a functionality between 2.3 to 3.0 with the cesium hydroxide catalyst and the propylene oxide or the first mixture of oxyalkylene monomers to form the first polyol mixture.

17. A method as recited in claim 14, wherein step b) comprises reacting the first polyol mixture with the cesium hydroxide catalyst and the second mixture of oxyalkylene monomers, the reaction continued provided that the unsaturation level of the second polyol mixture remains less than or equal to 0.06 meq/g KOH, the weight percentage of oxypropylene in the internal blocks is between 25 to 80% based on the total weight of all the oxyalkylenes and the initiator or mixture of initiators, and the weight percent of the external blocks is between 5% to 75% based on the total weight of all the oxyalkylenes and the initiator or mixture of initiators.

18. A method as recited in claim 14, further comprising after step b) and before step c) the further step of reacting the second polyol mixture with ethylene oxide to form a terminal ethylene oxide cap on the structure formed in step b), wherein the weight of the terminal ethylene oxide cap is between 4 and 25% by weight based on the total weight of all the oxyalkylenes and the initiator or mixture of initiators.

19. A method as recited in claim 14, wherein the second mixture of oxyalkylene monomers comprises a mixture of butylene oxide and ethylene oxide with at least 5.0% by weight of the oxyalkylene monomers being $C_4$ or higher and step b) comprises reacting the second mixture of oxyalkylene monomers with a cesium hydroxide catalyst and the first polyol mixture formed in step a), the reaction continued provided that the unsaturation level of the second polyol mixture remains less than or equal to 0.06 meq/g KOH and the weight percentage of oxypropylene in the internal blocks is between 25 to 80% based on the total weight of all the oxyalkylenes and the initiator or mixture of initiators.

20. A method as recited in claim 19, wherein the second mixture of oxyalkylene monomers comprises 1,2-butylene oxide and ethylene oxide mixed in a ratio of between 0.5:1 to 4:1, respectively and step b) comprises reacting the second mixture of oxyalkylene monomers with a cesium catalyst and the first polyol mixture formed in step a), the reaction continued provided that the unsaturation level of the second polyol mixture remains less than or equal to 0.06 meq/g KOH and the weight percentage of oxypropylene in the internal blocks is between 25 to 80% based on the total weight of all the oxyalkylenes and the initiator or mixture of initiators.

21. A method as recited in claim 14, wherein step c) a sufficient stoichiometric excess of a polyisocyanate or a mixture of polyisocyanates is used to produce a prepolymer composition having a free NCO level of between 0.5 to 30% by weight based on the total weight of the prepolymer.

22. A method as recited in claim 14, wherein step b) is continued until the equivalent weight of the polyether polyols formed in step b) are greater than or equal to 1500 Daltons.

23. A method as recited in claim 14, wherein the chain extender comprises a diol, a triol, a tetraol, or mixtures thereof having equivalent weights that are less than 250; and step d) comprises forming the sealant by reacting the prepolymer formed in step c) with the chain extender.

* * * * *